United States Patent
Nishida

(10) Patent No.: US 7,538,529 B2
(45) Date of Patent: May 26, 2009

(54) POWER-SUPPLY APPARATUS

(75) Inventor: Junji Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 353 days.

(21) Appl. No.: 10/587,622

(22) PCT Filed: Feb. 17, 2005

(86) PCT No.: PCT/JP2005/002951

§ 371 (c)(1),
(2), (4) Date: Jul. 26, 2006

(87) PCT Pub. No.: WO2005/078929

PCT Pub. Date: Aug. 25, 2005

(65) Prior Publication Data

US 2008/0218144 A1    Sep. 11, 2008

(30) Foreign Application Priority Data

Feb. 18, 2004    (JP) ............... 2004-041529

(51) Int. Cl.
*G05F 1/10*    (2006.01)
*G05F 1/656*    (2006.01)
*G05F 1/652*    (2006.01)

(52) U.S. Cl. .................. 323/282; 323/284; 323/222

(58) Field of Classification Search ............... 323/282, 323/284, 222

See application file for complete search history.

(56) References Cited

U.S. PATENT DOCUMENTS

| | | | | |
|---|---|---|---|---|
| 5,691,628 A | * | 11/1997 | Martin | 323/237 |
| 6,333,623 B1 | * | 12/2001 | Heisley et al. | 323/280 |
| 6,522,111 B2 | * | 2/2003 | Zadeh et al. | 323/277 |
| 6,650,097 B2 | * | 11/2003 | Sakurai | 323/279 |
| 2002/0039037 A1 | | 4/2002 | Takada et al. | |
| 2002/0130646 A1 | * | 9/2002 | Zadeh et al. | 323/275 |

FOREIGN PATENT DOCUMENTS

| | | |
|---|---|---|
| JP | 9-46200 | 2/1997 |
| JP | 2000-509933 | 8/2000 |
| JP | 2002-100972 | 4/2002 |
| JP | 2002-231949 | 8/2002 |
| WO | WO98/37630 | 8/1998 |

* cited by examiner

*Primary Examiner*—Bao Q Vu
(74) *Attorney, Agent, or Firm*—Cooper & Dunham, LLP

(57) ABSTRACT

A power-supply apparatus for outputting from an output terminal via one or more switching elements, each having a control electrode, a voltage input to an input terminal, is disclosed. The apparatus includes a voltage-generating circuit for generating an output voltage Vo proportional to a voltage between an input end and an output end of the switching element so as to output the generated voltage, and a control circuit for controlling an operation of the switching element depending on the output voltage Vo of the voltage-generating circuit. The control circuit causes the switching element to reduce an output current when the output voltage Vo of the voltage-generating circuit exceeds a predetermined voltage Vs.

12 Claims, 8 Drawing Sheets

POWER-SUPPLY APPARATUS

TECHNICAL FIELD

This disclosure generally relates to a power-supply apparatus comprising a protection circuit for preventing excess current output, and more specifically relates to a power-supply apparatus comprising a protection circuit for, when a voltage applied to a switching element for outputting a voltage input to an input terminal reaches a predetermined voltage or above, turning off the switching element for protection.

BACKGROUND ART

In a conventional power-supply apparatus, as illustrated in FIG. 8, a circuit for protecting a switching element outputs from an output terminal OUT an output voltage Vout, from an input voltage Vin input into an input terminal IN. A circuit is generally used that compares with a reference voltage Vs a voltage drop due to a fixed resistor Ra connected in series with a PMOS transistor Ma constituting a switching element. When the voltage drop as described above exceeds the reference voltage Vs, the circuit controls a gate voltage of the switching element Ma such that the impedance of the switching element Ma is increased so as to limit a current output from the output terminal OUT.

Moreover, FIG. 9 is an example circuit of a power-supply apparatus having combined a switching element Ma with a constant-voltage circuit. In the case of FIG. 9, the on-state resistance of the switching element Ma is set smaller than that of a voltage-controlling transistor Mb constituting the constant-voltage circuit. Thus, turning on the switching element Ma when a voltage Vin of an input terminal IN is at or below a rating output voltage of said constant-voltage circuit makes it possible to reduce a voltage difference between the input voltage Vin and an output voltage Vout.

Now, when the input voltage Vin reaches the rating output voltage of said constant-voltage circuit so as to make it possible for the constant-voltage circuit to output the rating output voltage, a control signal input to a gate of the switching element Ma turns off the switching element Ma so that the output voltage Vout is clamped at the rating output voltage of said constant-voltage circuit.

Moreover, in case the input voltage Vin reaches below the rating output voltage of said constant-voltage circuit so that the switching element Ma is turned on, when such accidents as a load short-circuiting, etc., occur, as the on-state resistance of the switching element Ma is small, an excess current flows from the input terminal IN through the switching element Ma so as to produce a defect in the switching element Ma. In order to protect the switching element Ma from such excess current, a current-controlling circuit as illustrated in FIG. 8 is added that connects a fixed resistor Ra in series with a switching element Ma. Furthermore, there is an excess-current protection system for making it possible to prevent destruction of semiconductor switches such as a MOSFET, etc., without using an IPS with a built-in fuse and an excess-current protection circuit (refer to Patent Document 1, for example).

Patent Document 1

Japanese Patent Laid-Open Publication 09-046200

However, in the conventional circuits as illustrated in FIGS. 8 and 9, there is a problem such that adding to a voltage drop caused by the switching element Ma on its own, the voltage drop due to the fixed resistor for current detection causes a fall in the output voltage Vout to become large. More specifically, in FIG. 9, when operating in a state such that the input voltage Vin is smaller than the rating output voltage of the constant voltage circuit, setting the voltage difference between the input terminal IN and the output terminal OUT as small as possible is desired. However, no matter how small the on-state resistance of the switching element Ma is set to be, due to the fixed resistor Ra, there is a limit to reducing the impedance between the input terminal IN and the output terminal OUT.

BRIEF SUMMARY

In an aspect of this disclosure, there is provided a protection circuit for preventing excess current output.

In another aspect of this disclosure, there is provided a power-supply apparatus comprising a protection circuit for, when a voltage applied to a switching element for outputting a voltage input to an input terminal reaches a predetermined voltage or above, turning off the switching element so as to protect the power-supply apparatus.

In another aspect of this disclosure, there is provided a power-supply apparatus for outputting from an output terminal via one or more switching elements, each having a control electrode, a voltage input to an input terminal including a voltage-generating circuit for generating an output voltage Vo proportional to a voltage between an input end and an output end of the switching element so as to output the generated voltage, and a control circuit for controlling an operation of the switching element depending on the output voltage Vo of the voltage-generating circuit wherein the control circuit causes the switching element to reduce an output current when the output voltage Vo of the voltage-generating circuit exceeds a predetermined voltage Vs.

BEST MODE FOR CARRYING OUT THE INVENTION

In the following, an embodiment of the present invention is described with reference to the accompanying drawings.

First Embodiment

Figure 1:
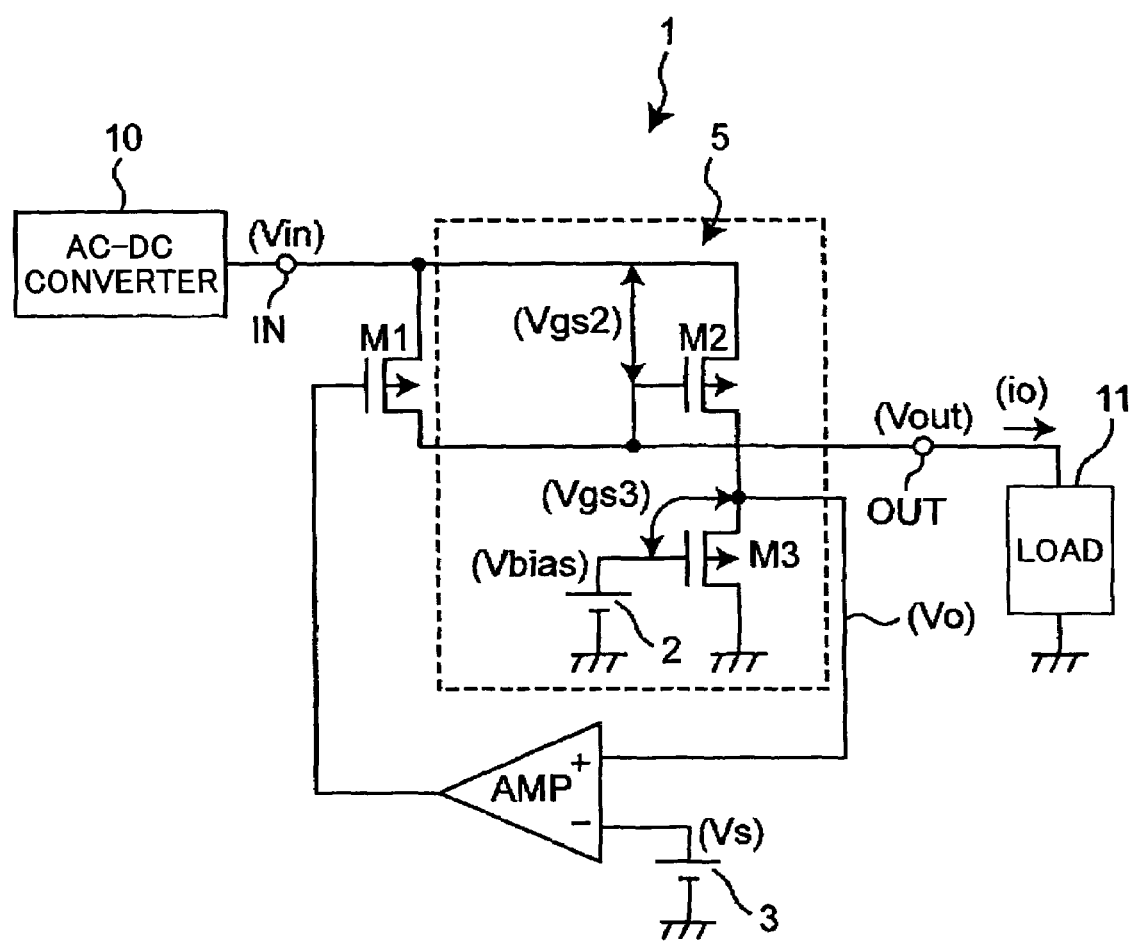
FIG. 1 illustrates an example circuit of a power-supply apparatus according to a first embodiment of the present invention.

FIG. 1 illustrates an example circuit of a power-supply apparatus according to a first embodiment of the present invention.

In FIG. 1, a power-supply apparatus 1 has an output voltage from an AC-DC converter 10 input to an input terminal IN as an input voltage Vin and outputs an output voltage Vout via a switching element M1 from an output terminal OUT to a load 11.

The power-supply apparatus 1 consists of a bias-voltage generating circuit 2, a reference-voltage generating circuit 3, PMOS transistors M1 through M3, and an operational-amplifier circuit AMP. It is noted that the PMOS transistor M2 constitutes a first MOS transistor, the PMOS transistor M3 constitutes a second MOS transistor, the reference-voltage generating circuit 3 and the operational-amplifier circuit AMP constitute a control circuit, and the operational-amplifier circuit AMP constitutes a comparator circuit.

The switching element M1 as described above is composed of a PMOS transistor connected between the input terminal IN and the output terminal OUT and having a gate connected to an output end of the operational-amplifier circuit AMP. Moreover, the PMOS transistors M2 and M3 are connected in series between the input terminal IN and a ground voltage. A junction between the PMOS transistors M2 and M3 is connected to a non-inverting input end of the operational-amplifier circuit AMP, while a predetermined voltage Vs from the reference-voltage generating circuit 3 is input to an inverting-input end of the operational-amplifier AMP.

A gate of the PMOS transistor M2 is connected to the output terminal OUT, while a predetermined bias voltage Vbias from the bias-voltage generating circuit 2 is input to a gate of the PMOS transistor M3. Moreover, a load 11 is connected between the output terminal OUT and the ground voltage. The PMOS transistors M2, M3 and the bias-voltage generating circuit 2 constitute a voltage-generating circuit 5 for generating a voltage Vo proportional to a voltage between the input terminal IN and the output terminal OUT so as to output the generated voltage to the non-inverting input end of the operational amplifier AMP.

In such a configuration as described above, as the PMOS transistors M2 and M3 are connected in series, the respective drain currents of the PMOS transistors M2 and M3 are the same. Thus, a gate-source voltage Vgs2 of the PMOS transistor M2 and a gate-source voltage Vgs3 of the PMOS transistor M3 are proportional to each other, and may be represented as equation (1) below, where K is a proportional constant:

$$Vgs2 = K \times Vgs3 \quad (1)$$

The gate-source voltage Vgs2 of the PMOS transistor M2 is the same as a source-drain voltage Vsd1 (not shown in FIG. 1) of the PMOS transistor M1, while a source voltage Vo of the PMOS transistor M3 is equal to the bias voltage Vbias added to the gate-source voltage Vgs3 of the PMOS transistor M3. Based on the above, equation (2) below applies:

$$Vo = Vbias + Vgs3 = Vbias + Vgs2/K = Vbias + Vsd1/K \quad (2)$$

In other words, it is understood that the source voltage Vo of the PMOS transistor M3 contains a portion which is linearly proportional to the source-drain voltage Vsd1 of the PMOS transistor M1.

Moreover, setting the electrical characteristics of the PMOS transistor M2 and of the PMOS transistor M3 the same results in Vgs2=Vgs3 so that the equation (2) as described above may be represented as in equation (3) below:

$$Vo = Vbias + Vgs3 = Vbias + Vgs2 = Vbias + Vsd1 \quad (3)$$

In other words, it is understood that the source voltage Vo of the PMOS transistor M3 would be equal to the bias voltage Vbias added to the source-drain voltage Vsd1 of the PMOS transistor M1 that is the voltage between the input terminal IN and the output terminal OUT.

The operational amplifier AMP compares the source voltage Vo of the PMOS transistor M3 with a reference voltage Vs and, when the source voltage Vo of the PMOS transistor M3 rises to reach the reference voltage Vs, the AMP output voltage rises to control the gate voltage of the PMOS transistor M1 and suppresses an increase in a current output from the output terminal OUT.

Figure 2:
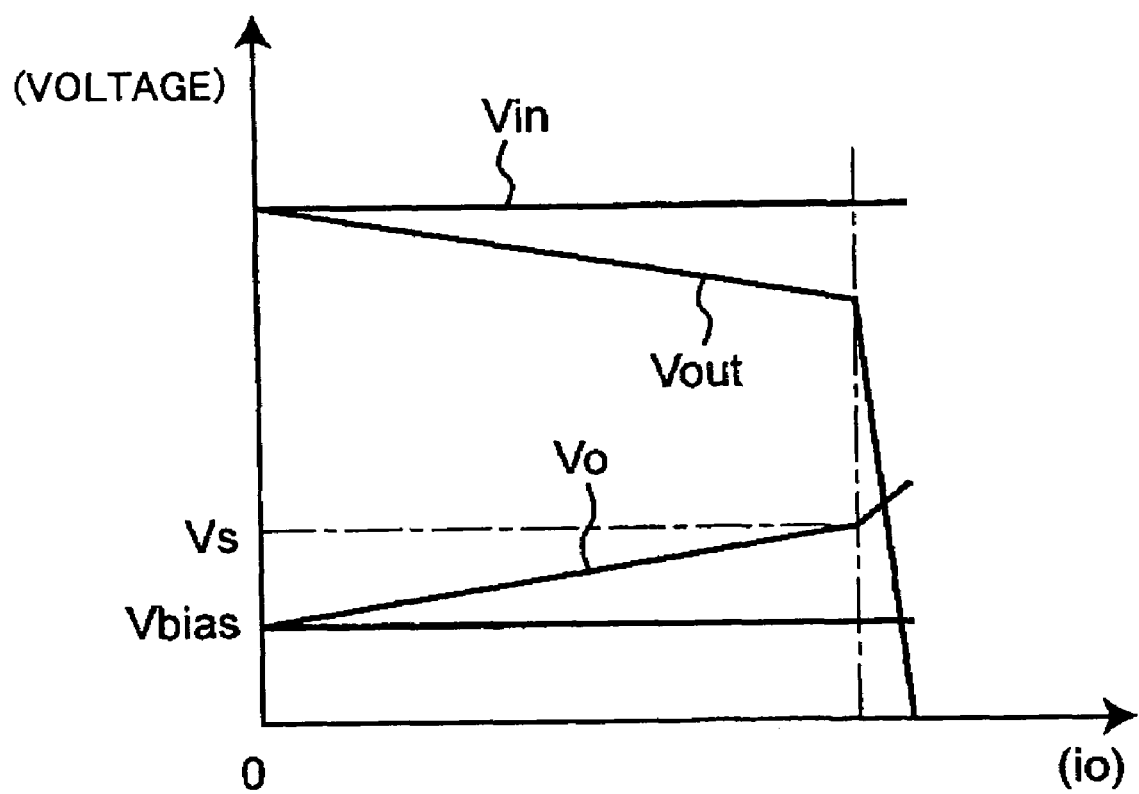
FIG. 2 illustrates an example of a change in each voltage in FIG. 1 relative to a change in a load current io.

Such operation as described above is described in a little more detail using FIG. 2. When a load current io flowing through the load 11 from the output terminal OUT is 0 (zero), the input voltage Vin and the output voltage Vout are the same. Moreover, the source voltage Vo of the PMOS transistor M3 is equal to the bias voltage Vbias. As the reference voltage Vs is larger than the bias voltage Vbias, an output signal of the operational-amplifier circuit AMP is at a low level.

Since an on-state resistance of the PMOS transistor M1 is approximately a few ohms, as the load current io increases the source-drain voltage Vsd1 of the PMOS transistor M1 increases while the output voltage Vout falls. On the other hand, the source voltage Vo of the PMOS transistor M3 rises at the same rate as the rate at which the output voltage Vout falls. When the source voltage Vo of the PMOS transistor M3 exceeds the reference voltage Vs, the output voltage of the operational-amplifier circuit AMP rises and limits a rise in an output current of the PMOS transistor M1, and furthermore when the load current io increases, the output voltage Vout falls rapidly.

Figure 3:
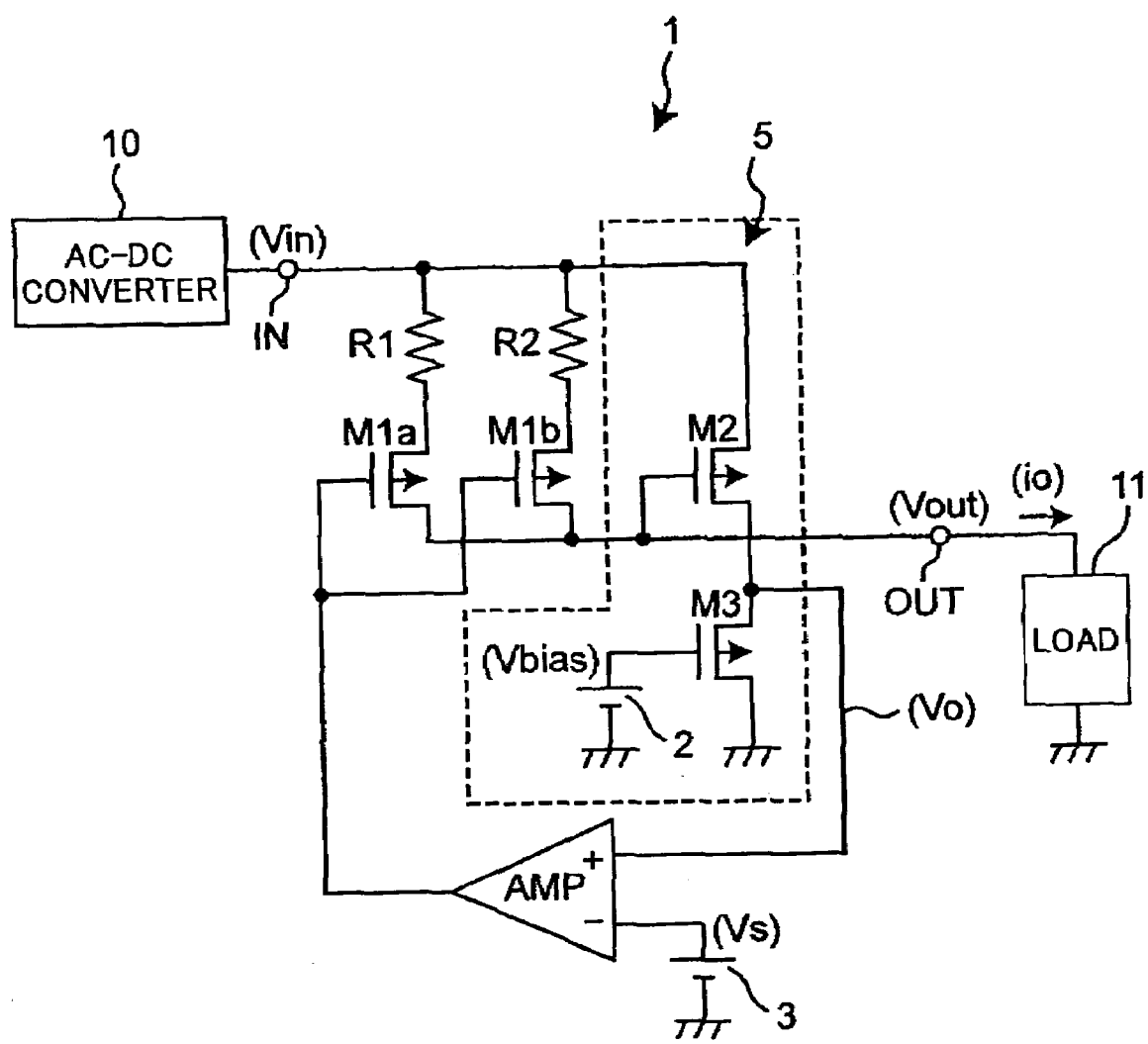
FIG. 3 illustrates another example circuit of the power-supply apparatus according to the first embodiment of the present invention.

Next FIG. 3 illustrates an example comprising multiple switching elements having the same characteristics. A configuration as illustrated in FIG. 3 is used when the load current io exceeds the current capacity of just one switching element or when trying to set the on-state resistance of the switching element as small as possible. It is noted that in FIG. 3 portions which are the same or similar to those in FIG. 1 are given the same letters so that the explanations are omitted. In a case such as in FIG. 3, inserting between the sources of PMOS transistors M1a and M1b and an input terminal IN fixed resistors R1 and R2, respectively, each with a small resistance value, parallel to each other makes it possible to set values of currents flowing through each of the PMOS transistors M1a and M1b the same.

Figure 4:
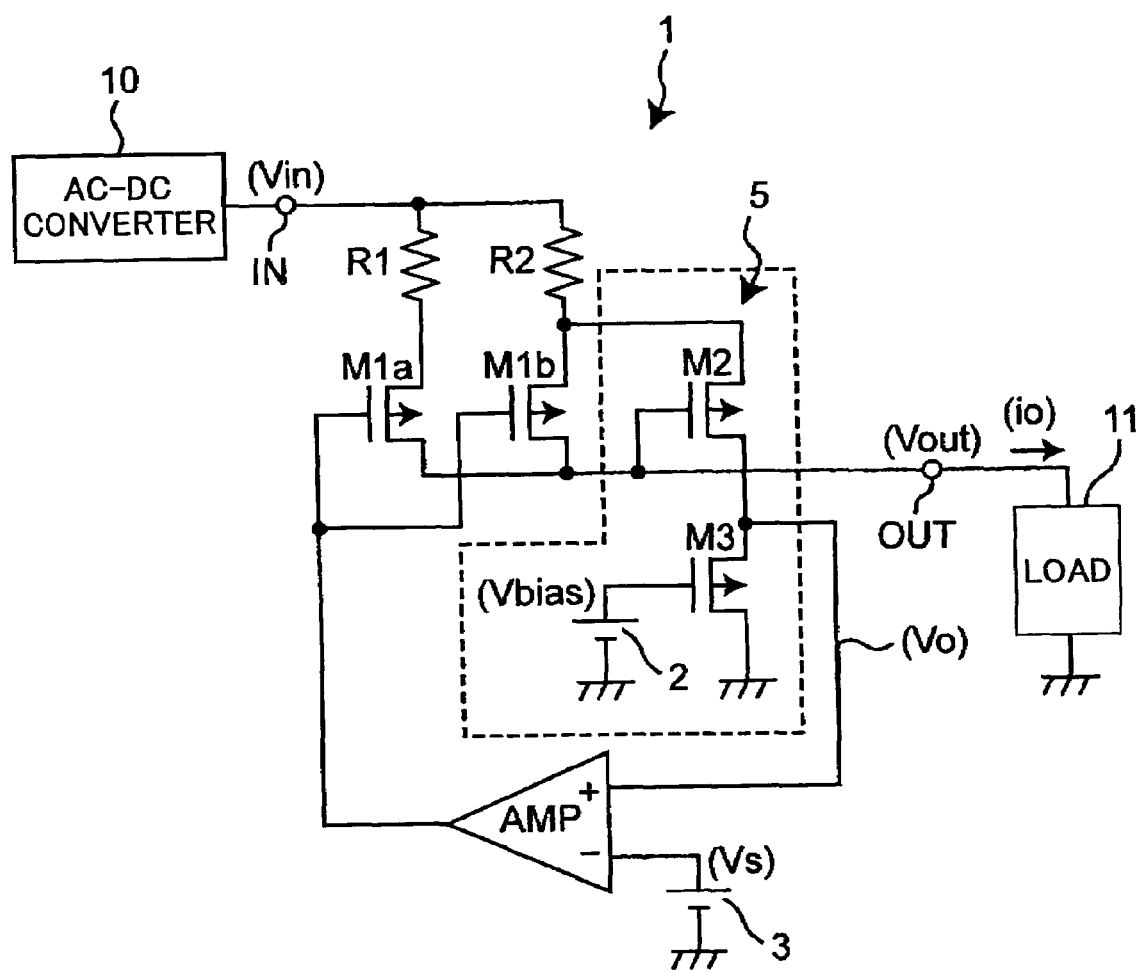
FIG. 4 illustrates yet another example circuit of the power-supply apparatus according to the first embodiment of the present invention.

Moreover, when the switching elements are configured as in FIG. 3, a voltage-generating circuit 5 has a source of a PMOS transistor M2 connected to an input terminal IN. In FIG. 4 the source is connected to PMOS transistor M1b. One of the above may be selected depending on whether the objective of protection in setting a voltage in the voltage-generating circuit 5 that is to be detected is a voltage between the input terminal IN and an output terminal OUT, or voltage drops in the switching elements themselves.

Figure 5:
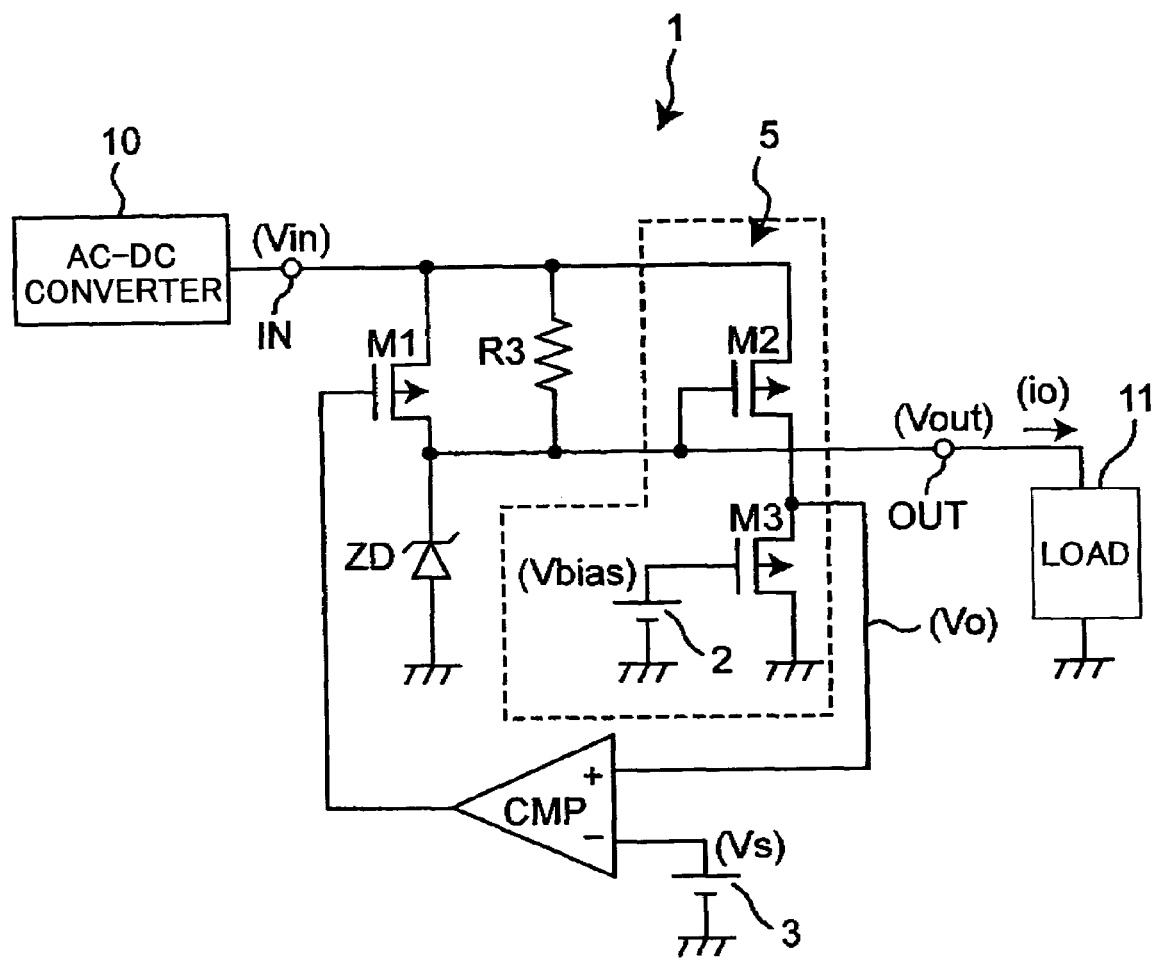
FIG. 5 illustrates yet another example circuit of the power-supply apparatus according to the first embodiment of the present invention.
Figure 6:
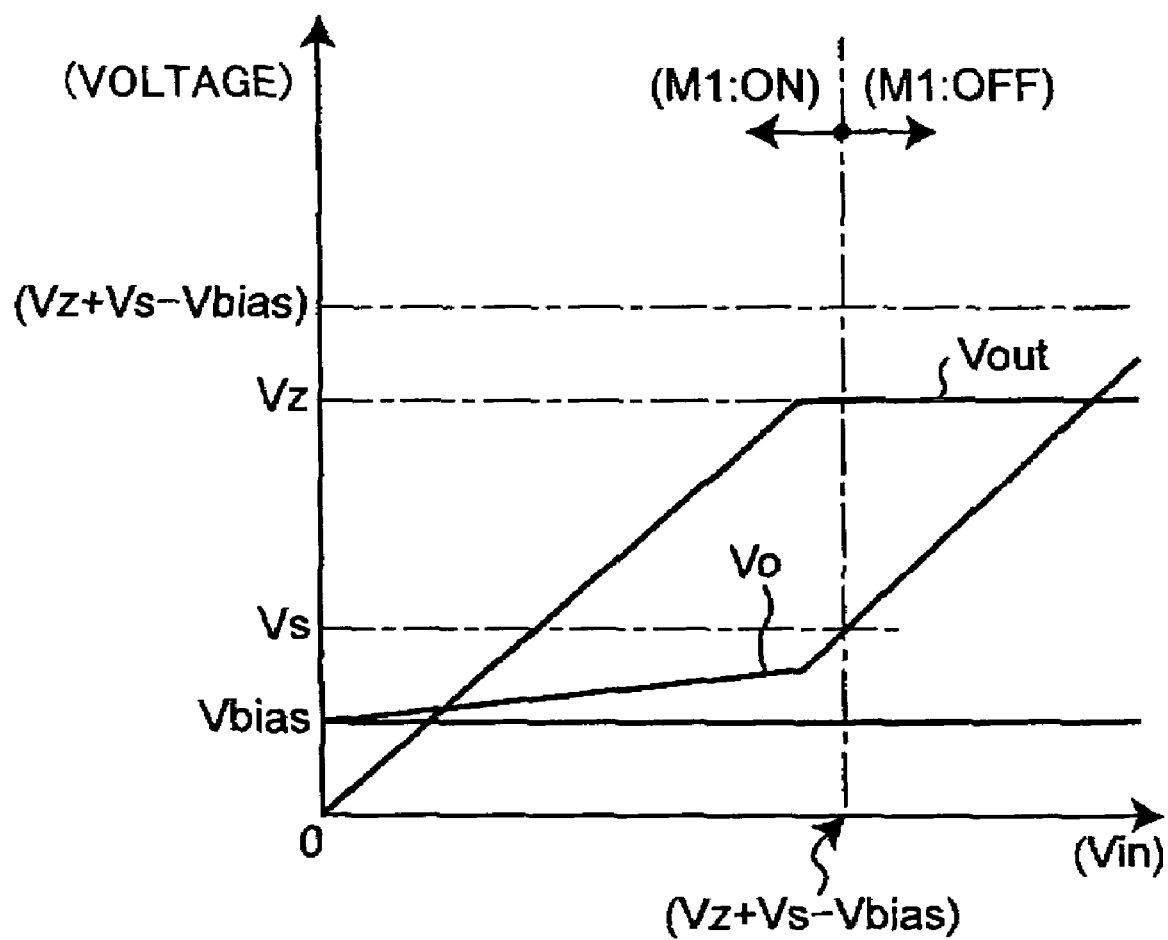
FIG. 6 illustrates an example of a change in each voltage in FIG. 5 relative to a change in an input voltage Vin.

FIG. 5 illustrates as an example a case such that a circuit for clamping an output voltage Vout at a predetermined voltage is comprised further to the configuration in FIG. 1, while FIG. 6 illustrates an example of a change in voltages at the respective portions in FIG. 5. It is noted that, in FIG. 5, portions which are the same as those in FIG. 1 are given the same letters so that the explanations are omitted herein and only differences with FIG. 1 are described.

The differences between FIG. 5 and FIG. 1 are that the operational-amplifier circuit AMP in FIG. 1 is changed to a comparator CMP, a fixed resistor R3 for supplying current is added between the input terminal IN and the output terminal OUT, and a Zener diode ZD is added between the output terminal OUT and the ground voltage. It is noted that the on-state resistance of the PMOS transistor M1 is set so as to be significantly smaller than the fixed resistor R3.

In FIG. 5, when an input voltage Vin is at or below a Zener voltage Vz of a Zenar diode ZD, as the PMOS transistor M1 is turned on, a current is supplied to a load 11 from the input terminal IN primarily through the PMOS transistor M1. Then, when the input voltage Vin exceeds the Zener voltage Vz, an output voltage Vout is clamped at the Zener voltage Vz as illustrated in FIG. 6. When the input voltage Vin rises further to exceed a voltage (Vz+Vs−Vbias), a bias voltage Vbias subtracted from a reference voltage Vs (Vs−Vbias) added to the Zener voltage Vz, as a source voltage Vo of a PMOS transistor M3 exceeds a reference voltage Vs, the signal level of an output signal of a comparator CMP inverts, turning off the PMOS transistor M1. In such a state, a current is supplied to the load 11 via the fixed resistor R3.

In case the input voltage Vin is at or below the Zener voltage Vz of the Zener diode ZD and the PMOS transistor M1 is turned on, when an excess load current io flows due to the load 11 short-circuiting, etc., a voltage drop between the input terminal IN and the output terminal OUT becomes large. When the voltage drop reaches at or above the voltage difference between the reference voltage Vs and the bias voltage Vbias, as the source voltage Vo of the PMOS transistor M3 exceeds the reference voltage Vs, the output signal of the comparator CMP is inverted to turn to a High level. Thus, turning off the PMOS transistor M1 so as to make the fixed resistor R3 the only path for supplying current to the load 11 makes it possible to protect the PMOS transistor M1 from excess current as well as to supply a small current to the load 11.

Figure 7:
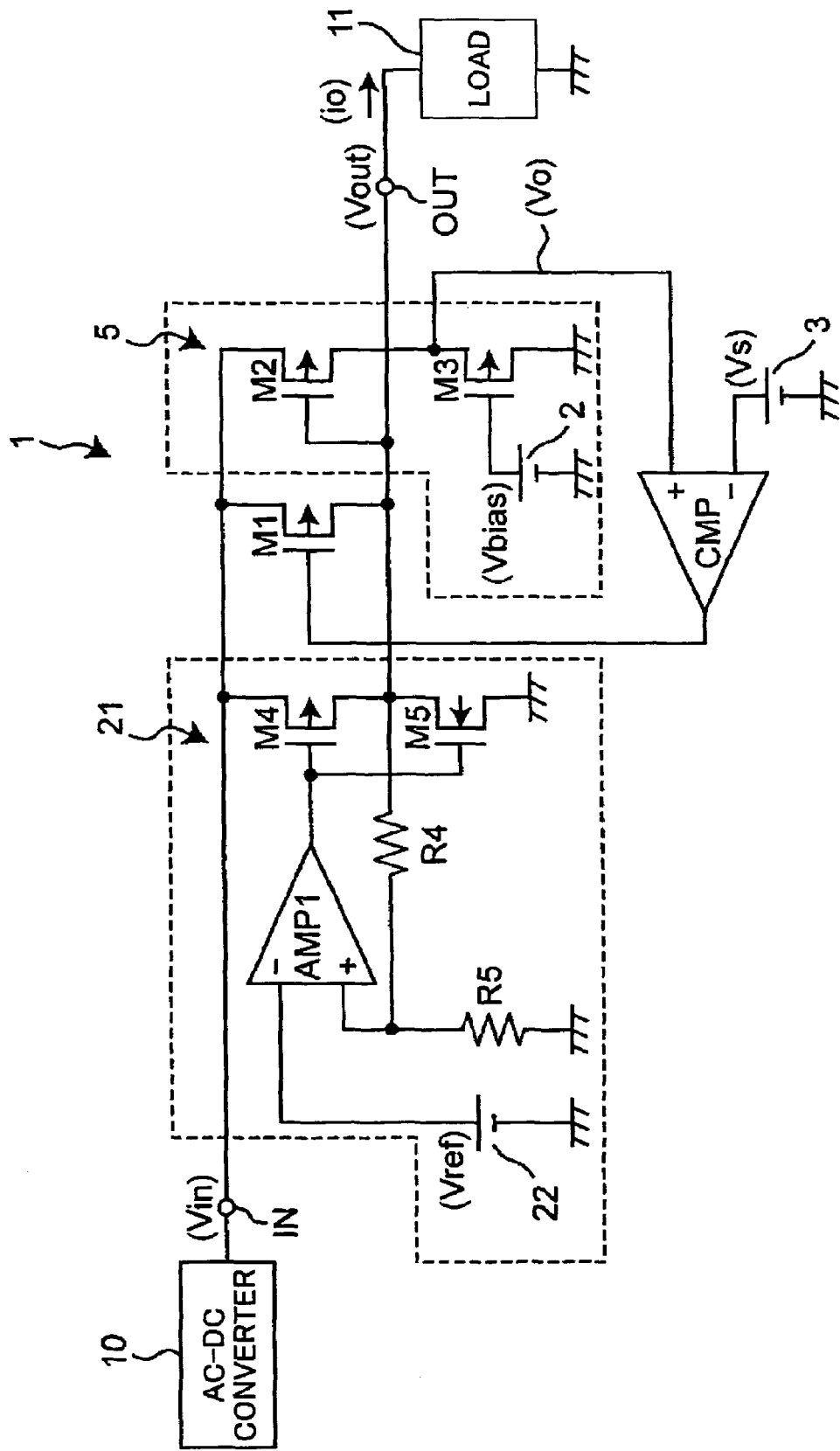
FIG. 7 illustrates yet another example circuit of the power-supply apparatus according to the first embodiment of the present invention.
Figure 8:
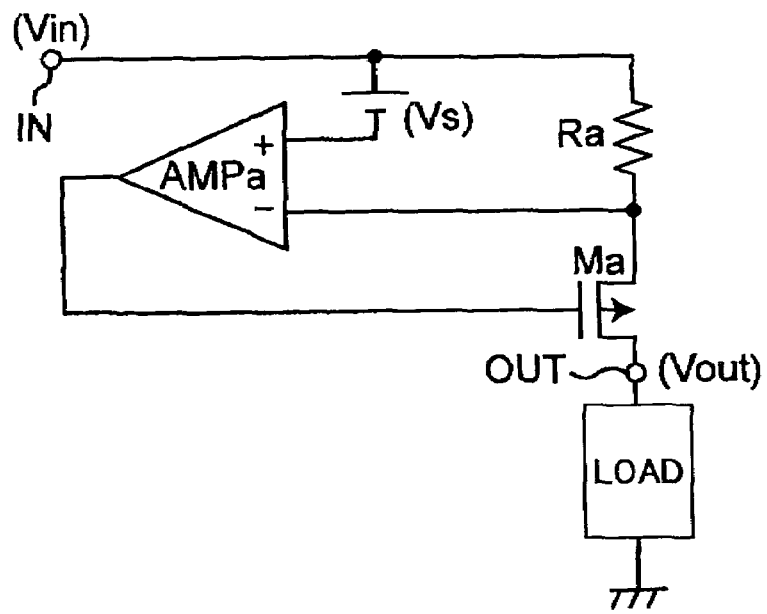
FIG. 8 illustrates an example circuit of a conventional power-supply apparatus.
Figure 9:
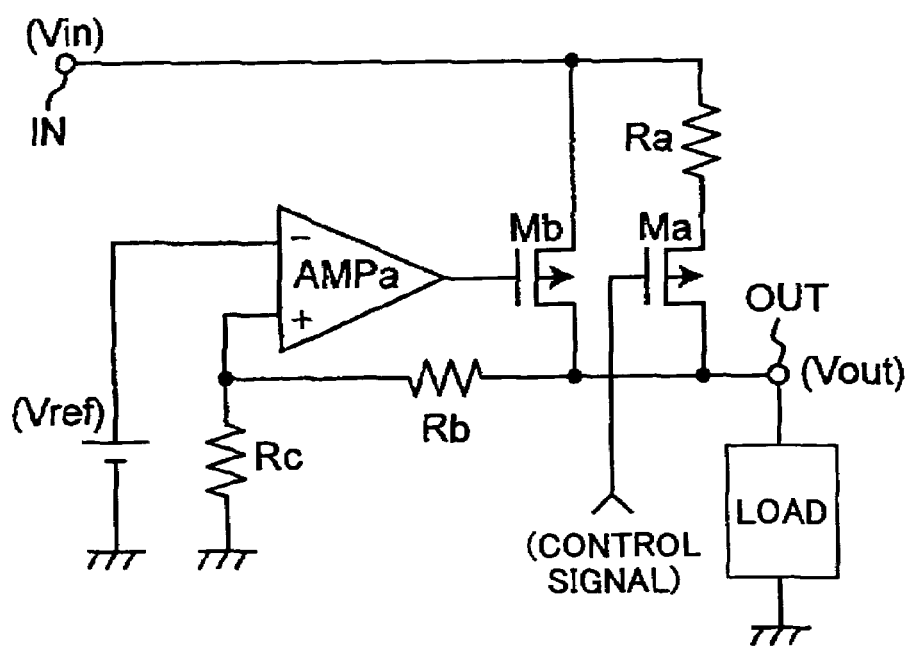
FIG. 9 illustrates another example circuit of the conventional power-supply apparatus.

Next, FIG. 7 illustrates as an example a case of using a constant-voltage circuit in lieu of a Zener diode ZD in FIG. 5. It is noted that in FIG. 7 portions which are the same or similar to those in FIG. are given the same letters so that the explanations are omitted.

In FIG. 7, the operational-amplifier circuit AMP in FIG. 5 is replaced with a comparator CMP, while a constant-voltage circuit 21 consists of an operational-amplifier circuit AMP1, a reference-voltage generating circuit 22 for generating a predetermined reference voltage Vref for output the generated voltage, a PMOS transistor and a NMOS transistor M5 for voltage control, and resistors R4 and R5 for output-voltage detection.

The PMOS transistor M4 and the NMOS transistor M5 are connected in series between an input terminal IN and a ground voltage while gates of the PMOS transistor M4 and the NMOS transistor M5 are respectively connected to an output end of the operational-amplifier circuit AMP1. The resistors R4 and R5 are connected in series between a junction of the PMOS transistor M4 and the NMOS transistor M5, and the ground voltage, while a junction of the resistors R4 and R5 is connected to a non-inverting input end of the operational-amplifier circuit AMP1. Moreover, a reference voltage Vref is input to an inverting input end of the operational-amplifier circuit AMP1.

In such a configuration as described above, when a voltage Vin is at or below a rating output voltage of the constant-voltage circuit 21, as a PMOS transistor M1 being a switching element is turned on, a current is supplied to a load 11 from an input terminal IN via primarily the PMOS transistor M1. At this time, while a current supplied to the load 11 flows also from the PMOS transistor M4 of the constant-voltage circuit 21, as the on-state resistance of the PMOS transistor M4 is significantly larger than the on-state resistance of the PMOS transistor M1, as described above, most of the load current io is supplied from the PMOS transistor M1.

When the input voltage Vin exceeds a rating output-voltage Vx of the constant-voltage circuit 21, an output voltage Vout is clamped at the rating output-voltage Vx. When the input voltage Vin further rises to exceed a voltage (Vx+Vs−Vbias) having added to the rating output voltage Vx of the constant-voltage circuit 21 a voltage subtracting a bias voltage Vbias from a reference voltage Vs (Vs−Vbias), as a source voltage Vo of the PMOS transistor M3 exceeds the reference voltage Vs, the signal level of an output signal of the comparator CMP is inverted, turning off the PMOS transistor M1. In such a state as described above, a current from the constant-voltage circuit 21 is supplied to the load 11. An operation at a time when the input voltage Vin is at or below the rating output voltage Vx of the constant-voltage circuit 21 so that the PMOS transistor M1 is turned on is almost the same as the operation in FIG. 5.

When an excess current flows out of an output terminal OUT due to the load 11 short-circuiting, etc., a voltage drop between the input terminal IN and the output terminal OUT becomes large. When the voltage drop reaches at or above the voltage difference between the reference voltage Vs and the bias voltage Vbias, the source voltage Vo of the PMOS transistor M3 exceeds the reference voltage Vs so that the signal level of the output signal of the comparator CMP is inverted to turn to a High level. Thus, the PMOS transistor M1 is turned off, making it possible to protect the PMOS transistor M1 from excess current. Only a current from the PMOS transistor M4 of the constant-voltage circuit 21 is supplied to the load 11. As described previously, as a current-supply capability of the PMOS transistor M4 is significantly smaller than that of the PMOS transistor M1, it is possible to reduce the capability of supplying current to the load 11.

It is noted that, while in FIGS. 5 and 7 a case of having a single PMOS transistor M1 as a switching element is illustrated as an example, even in a case of having multiple PMOS transistors M1 as in FIGS. 3 and 4, the same operations are performed. In the latter case, when the voltage between the input terminal IN and the output terminal OUT is to be a voltage detected in the voltage-generating circuit 21, the source of the PMOS transistor M2 may be connected to the input terminal IN, while when the voltage drops of the switching elements themselves are to be the voltages detected, the source of the PMOS transistor M2 may be connected to a source of one of the switching elements.

The invention claimed is:

1. A power-supply apparatus for outputting from an output terminal an output voltage Vout corresponding to an input voltage input through an input terminal, via each of one or more switching elements, each element having a control electrode, said power-supply apparatus comprising:
   a voltage-generating circuit for generating a first voltage Vo proportional to a second voltage between an input end and an output end of said switching element so as to output the generated first voltage Vo, said first voltage Vo being different from said output voltage Vout; and
   a control circuit for controlling an operation of said switching element depending on the first voltage Vo of the voltage-generating circuit;
   wherein the control circuit causes the switching element to reduce an output current when the first voltage Vo of the voltage-generating circuit exceeds a predetermined reference voltage Vs.

2. A power-supply apparatus for outputting from an output terminal an output voltage Vout corresponding to a voltage input through an input terminal, via each of one or more switching elements, each element having a control electrode, said power-supply apparatus comprising:

a voltage-generating circuit for generating a first voltage Vo proportional to a second voltage between said input terminal and said output terminal so as to output the generated first voltage Vo, said first voltage Vo being different from said output voltage Vout; and a control circuit for controlling an operation of said switching element depending on the first voltage Vo of the voltage-generating circuit;

wherein the control circuit causes the switching element to reduce an output current when the first voltage Vo of the voltage-generating circuit exceeds a predetermined reference voltage Vs.

3. A power-supply apparatus for controlling a voltage input to an input terminal such that the voltage reaches at or below a predetermined clamping voltage so as to output an output voltage Vout from an output terminal, said power-supply apparatus comprising:

one or more switching elements, each having a control electrode that is connected between said input terminal and the output terminal;

a voltage-generating circuit for generating a first voltage Vo proportional to a second voltage between an input end and an output end of each of said switching elements so as to output the generated first voltage Vo, said first voltage Vo being different from said output voltage Vout; and a control circuit for controlling an operation of said switching element depending on the first voltage Vo of the voltage-generating circuit;

wherein the control circuit causes the switching element to reduce an output current when the first voltage Vo of the voltage-generating circuit exceeds a predetermined reference voltage Vs.

4. A power-supply apparatus for controlling a voltage input to an input terminal such that the voltage reaches at or below a predetermined clamping voltage so as to output an output voltage Vout from an output terminal, said power-supply apparatus comprising:

one or more switching elements, each having a control electrode that is connected between said input terminal and the output terminal;

a voltage-generating circuit for generating a first voltage Vo proportional to a second voltage between said input terminal and said output terminal so as to output the generated first voltage Vo, said first voltage Vo being different from said output voltage Vout; and a control circuit for controlling an operation of each of said switching elements depending on the first voltage Vo of the voltage-generating circuit;

wherein the control circuit causes the switching element to reduce an output current when the first voltage Vo of the voltage-generating circuit exceeds a predetermined reference voltage Vs.

5. The power-supply apparatus as claimed in claim 1, wherein the voltage-generating circuit comprises:

a first MOS transistor having a source connected to said input terminal and a gate connected to said output terminal; and a second MOS transistor having a source, a drain and a gate that are respectively connected to a drain of the first MOS transistor, a ground voltage, and a predetermined voltage Vbias;

and wherein said first MOS transistor and said second MOS transistor, being of the same type of MOS transistor output from a junction of said first MOS transistor and second MOS transistor a voltage Vo proportional to a voltage between said input terminal and the output terminal.

6. The power-supply apparatus as claimed in claim 5, wherein said first MOS transistor and said second MOS transistor have the same electrical characteristics.

7. The power-supply apparatus as claimed in claim 5, wherein each of said first MOS transistor and said second MOS transistor is a PMOS transistor.

8. The power-supply apparatus as claimed in claim 5, wherein said proportional voltage Vo is a voltage having added to a predetermined voltage Vbias a gate-source voltage of the second MOS transistor.

9. The power-supply apparatus as claimed in claim 1, wherein said control circuit comprises:

a reference-voltage generating circuit for generating a predetermined reference voltage Vs so as to output the generated voltage; and a comparator circuit for controlling the operation of said switching element such that said proportional output voltage Vo reaches said reference voltage Vs.

10. The power-supply apparatus as claimed in claim 1, wherein said switching element, said voltage-generating circuit, and said control circuit are integrated into one integrated circuit.

11. The power-supply apparatus as claimed in claim 1, wherein said first voltage Vo is not directly proportional to said output voltage Vout.

12. The power-supply apparatus as claimed in claim 1, wherein as said input voltage input through an input terminal remains constant and output current increases, said output voltage Vout output from said output terminal decreases and said first voltage Vo increases.

* * * * *